United States Patent
Kang et al.

(10) Patent No.: US 9,521,856 B2
(45) Date of Patent: Dec. 20, 2016

(54) DRIED SILKEN TOFU

(75) Inventors: De Ik Kang, Goyang-si (KR); Yoon Jung Choi, Seoul (KR); Hyo Geun An, Seoul (KR); Hong Wook Park, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 308 days.

(21) Appl. No.: 14/116,020

(22) PCT Filed: May 1, 2012

(86) PCT No.: PCT/KR2012/003392
§ 371 (c)(1),
(2), (4) Date: Nov. 20, 2013

(87) PCT Pub. No.: WO2012/153932
PCT Pub. Date: Nov. 15, 2012

(65) Prior Publication Data
US 2014/0087057 A1    Mar. 27, 2014

(30) Foreign Application Priority Data

May 6, 2011    (KR) .................. 10-2011-0042908

(51) Int. Cl.
*A23B 4/037*    (2006.01)
*A23L 1/20*    (2006.01)
*A23C 20/02*    (2006.01)

(52) U.S. Cl.
CPC .............. *A23L 1/2006* (2013.01); *A23B 4/037* (2013.01); *A23C 20/025* (2013.01); *A23L 11/07* (2016.08); *A23V 2002/00* (2013.01)

(58) Field of Classification Search
CPC .............................. A23L 1/2006; A23B 4/037
See application file for complete search history.

(56) References Cited

FOREIGN PATENT DOCUMENTS

| JP | 11-75751 A | 3/1999 |
| JP | 11-137203 A | 5/1999 |
| JP | 2000-228961 A | 8/2000 |
| KR | 10-2004-0074515 A | 8/2004 |
| KR | 10-2005-0068463 A | 7/2005 |
| KR | 10-0891445 B1 | 4/2009 |

OTHER PUBLICATIONS

Endo et al.—JP 2000228961A, JPO Machine Translation, Sep. 1, 2015.*

* cited by examiner

*Primary Examiner* — Elizabeth Gwartney
(74) *Attorney, Agent, or Firm* — Seed IP Law Group LLP

(57) ABSTRACT

Provided is a dried soft bean curd and a drying method of soft bean curd capable of recovering a taste and texture of soft bean curd before drying as it is by vacuum freeze-drying the soft bean curd without a pre-freezing process. In addition, provided are soft bean curd having excellent physical properties of the bean curd, and a manufacturing method of soft bean curd including a step of adding starch to soy milk and a step of heating the starch for gelatinizing starch. Further, provided is a stirring method capable of uniformly dispersing the starch in soy milk by preparing and using starch in a starch dispersion solution state. Furthermore, provided are a manufacturing method of soft bean curd for drying by adding starch and gelatinizing the added starch, and a manufacturing method of dried soft bean curd by vacuum freeze-drying this soft bean curd for drying.

5 Claims, 10 Drawing Sheets

| material | VD | 1cm | 3cm | 5cm | Result of Sensory test |
|---|---|---|---|---|---|
| 10brix Calcium sulfate | | | | | * internal cracking<br>* softness<br>* agglomerating in chew<br>* resilience |
| 10brix GDL | | | | | * sour taste<br>* substantial cracking<br>* slightly friable texture<br>* softness |

FIG. 9

DRIED SILKEN TOFU

CROSS REFERENCE TO RELATED APPLICATIONS

This application is a U.S. national stage application filed under 35 U.S.C. §371 of International Patent Application No. PCT/KR2012/003392 accorded an international filing date of May 1, 2012, which application claims priority from Korean Patent Application No. 10-2011-0042908 filed on May 6, 2011.

BACKGROUND

1. Technical Field

The present invention relates to dried soft bean curd, and more particularly, to high-quality dried soft bean curd capable of having a taste and texture almost similar to those of original soft bean curd before drying after recovery, having strength larger than that of the existing soft bean curd, and having elasticity.

2. Description of the Related Art

Tofu, also called bean curd, which is a food rich in minerals including calcium and protein, has been frequently used in various dishes due to plain taste and soft texture. However, while the bean curd is rich in moisture and nutrients, it is also susceptible to easily decaying and strength of tissue of the bean curd is weak, such that there is a disadvantage in that it is difficult to store and distribute the bean curd. Therefore, a method of drying bean curd has been suggested as a method for simultaneously solving the storage and portability problems of the bean curd.

As a technology associated with the drying method of bean curd, in a dried bean curd and a method thereof disclosed in Korean Patent Publication No. 2000-53766, a method of putting bean curd into a vacuum drier to reducing pressure and drying the bean curd at 60° C. for 18 to 20 hours has been suggested, and in a manufacturing method of bean curd disclosed in Korean Patent Registration No. 10-0891445, the bean curd is subjected to a step of pre-cooling the bean curd for about 1 hour at a timing at which an ice phase is generated on a surface of the bean curd, a step of putting the cooled bean curd into a vacuum freeze-drier to reduce pressure so that a temperature of the bean curd arrives at 40° C. and a step of vacuum freezing the bean curd. Therefore, there are limitations in that the steps are troublesome and complicated, a long period of time is consumed, and significant denaturation of protein is generated, such that taste and flavor of the bean curd are denatured and the taste of fresh bean curd is not completely recovered at the time of recovering the bean curd, and tissue of the bean curd is destroyed during a freezing process, such that the texture of the bean curd is not recovered.

BRIEF SUMMARY

Technical Problem

The present invention provides a drying method of soft bean curd capable of recovering taste and texture of soft bean curd before drying as it is by vacuum freezing the soft bean curd to dry the soft bean curd so as to minimize denaturation of protein in the bean curd without a pre-freezing process.

In addition, the present invention provides high quality soft bean curd capable of having strength larger than that of the existing soft bean curd and having elasticity in view of physical properties such as hardness of the bean curd, and the like, by providing a manufacturing method of soft bean curd including adding starch to soy milk and heating for gelatinizing the starch in manufacturing the soft bean curd, and a manufacturing method thereof.

Further, the present invention provides a stirring method capable of uniformly dispersing the starch in soy milk by using starch in a starch dispersion solution state at the time of performing a step of stirring the starch and the soy milk with each other during a manufacturing process of the bean curd.

Furthermore, the present invention provides a manufacturing method of soft bean curd for drying so as to be suitable for manufacturing dried soft bean curd by adding starch and gelatinizing the added starch in manufacturing bean curd, and a manufacturing method of dried soft bean curd by vacuum freeze-drying this soft bean curd for drying.

Technical Solution

According to an exemplary embodiment of the present invention, there is provided a manufacturing method of soft bean curd including: adding starch to soy milk; and heating for gelatinizing the added starch in a manufacturing method of soft bean curd.

According to the exemplary embodiment of the present invention, the starch added to the soft bean curd is subjected to a gelatinization reaction during a manufacturing process of the bean curd, such that high quality soft bean curd having strength larger than that of the existing soft bean curd and elasticity in view of physical properties such as hardness of the bean curd, and the like.

According to another exemplary embodiment of the present invention, there is provided a stirring method capable of uniformly dispersing the starch in soy milk by using the starch in a starch dispersion solution state in a method of stirring the starch in the soy milk during a manufacturing process of the bean curd.

According to another exemplary embodiment of the present invention, there is provided a drying method of soft bean curd capable of recovering taste and texture of soft bean curd before drying as it is by vacuum freeze-drying the soft bean curd without a pre-freezing process.

The following embodiment is only an exemplary embodiment of the present invention, and contents of the present invention should not be interpreted as being limited to the following embodiment.

In detail, the present invention relates to a manufacturing method of soft bean curd for drying different from the existing soft bean curd in order to allow the dried soft bean curd to have texture similar to that of the original after being recovered, and a drying method of the bean curd for drying.

The present invention may include a manufacturing process of soy milk, a process of adding dilute water, modified starch, an anti-oxidant, and a coagulant to the soy milk to stir the mixture, a packaging process of a soy milk mixed solution in a soft bean curd pouch, a heating process of the packaged soft bean curd, a cooling process of the coagulated soft bean curd, a cutting process of the cooled soft bean curd, a vacuum freezing process of the cut soft bean curd, and a freeze-drying process of the vacuum-frozen soft bean curd.

The present invention, which relates to the soft bean curd having higher quality in view of the physical properties such as hardness of the bean curd, and the like, may include a step of adding starch to the soy milk and a step of gelatinizing the added starch during the manufacturing process of the bean curd in order to provide the soft bean curd that is excellent for being used as soft bean curd for drying in order to manufacture dried soft bean curd and has excellent texture even though the soft bean curd is not manufactured as the dried soft bean curd. As the starch, preferably, modified starch, for example, modified tapioca starch, modified rice starch, modified sweet potato starch, modified potato starch, modified corn starch, or the like, may be used, and more preferably, the modified tapioca starch may be used. The starch may be added preferably at a content of 0.1 to 3 weight %, more preferably, 1 weight %, based on the total weight of the soy milk mixture solution.

At the time of mixing the starch with the soy milk, in order to uniformly disperse the starch in the soy milk, it is preferable that after primarily stirring the starch in dilute water using a homomixer known in the art to prepare the starch dispersion solution, the prepared starch dispersion solution is put into a stirred tank filled with the soy milk, and then a secondary stirring step proceeds. In the primary stirring step, the antioxidant may be additionally added and stirred.

As the coagulant put into the secondarily stirred soy milk mixed solution, it is preferable that glucono delta lactone (GDL) decomposing a functional group of the starch to inhibit effect of the starch is not used. More preferably, a mixed coagulant not containing GDL, magnesium chloride, or prepared bittern is used as the coagulant, and most preferably, calcium sulfate may be used as the coagulant.

At the time of heating the secondarily stirred soy milk mixed solution, it is preferable that the mixed solution is heated at a starch gelatinization temperature or more to thereby induce the gelatinization reaction of starch. In a detailed exemplary embodiment of the present invention, when the starch added to the soy milk is the modified tapioca starch, considering that the gelatinization temperature is 70 to 75° C. a heating bath is heated to about 80 to 100° C. or more, preferably 86° C. or more for 40 minutes or more, preferably, 1 hour or more so that a central portion temperature of the bean curd becomes about 80 to 100° C. or more, preferably, 83° C. or more, thereby gelatinizing the starch. The heating process may be preferably performed by hot water treatment.

A composition of the soft bean curd manufactured as described above may contain preferably 9 to 12 brix (water-soluble solid concentration) soy milk, more preferably, 10.5 brix soy milk and based on the total weight of the soy milk, contain preferably 0.1 to 3 weight %, more preferably 1 weight % of starch and preferably 0.1 to 1 weight %, more preferably 0.3 weight % of the coagulant. Additionally, 0.01 to 1 weight %, more preferably, 0.15 weight % of the antioxidant may be further contained therein.

The soft bean curd manufactured as described above may have harder and bouncier texture than that of general soft bean curd according to the related art in view of physical properties such as hardness, gumminess, and chewiness of the bean curd, and the like.

More specifically, as in a specific Example (Comparative Examples 2-1 and 3-2), physical properties of the soft bean curd manufactured as described above may be measured using a texture analyzer (model name: TA-XT Plus, product by MHK Trading Company) under the following Conditions.

Probe: a cylindrical shape having a diameter of 20 mm;
Speed at which the probe descends to a sample (pre-test speed): 1.00 mm/sec;
Speed at which the probe contacts a surface of the sample and then infiltrates into the sample (test speed): 5.00 mm/sec;
Speed at which the probe infiltrated into the sample and returns to an original position (post-test speed): 5.00 mm/sec;
Target mode of the probe: distance;
Distance at which the probe recognizes the surface of the sample and infiltrated through the sample: 5.000 mm;
Condition for allowing the probe to recognize the sample (Trigger type): force; and
Minimum force for allowing the probe to recognize the sample (Trigger force): 5.0 g.

As a result obtained by measuring the physical properties of the soft bean curd, it was confirmed that the bean curd according to the present invention had hardness of 120 to 160 g, such that the bean curd had hard and elastic properties as compared to control groups (starch-free bean curd or bean curd in which starch is added but not gelatinized) having hardness of 30 to 100 g (See Tables 2 and 3).

The soft bean curd used in the manufacturing method of dried soft bean curd is not particularly limited, and known bean curd may be used. That is, in the case of drying the known bean curd sold on the market using the manufacturing method of dried soft bean curd according to the present invention, dried soft bean curd having excellent quality may be obtained as compared to the existing manufacturing method of dried soft bean curd. However, in order to obtain soft bean curd having the highest quality and texture almost similar to that of the original soft bean curd, more preferably, the soft bean curd manufactured as described above may be used as the soft bean curd for drying.

An aspect of the manufacturing method of dried soft bean curd may include the following process.

Prepared soft bean curd is put into a device used for freezing and drying in a state in which the soft bean curd is not pre-frozen but cooled. A freezing process of the soft bean curd is a vacuum freezing process performed under reduced pressure. According to the exemplary embodiment of the present invention, the soft bean curd is rapidly vacuum frozen by controlling a time for passing through a section in which a degree of vacuum is decreased from 4 torr to 2.5 torr (absolute pressure) to be within preferably 30 minutes, more preferably, 15 minutes.

Therefore, a time for passing through a section in which the central portion temperature of the soft bean curd is decreased from 0 to −5° C. becomes within preferably 30 minutes, more preferably 15 minutes, such that denaturation of proteins in the bean curd may be minimized, thereby making it possible to obtain high quality soft bean curd. That is, in the case of using the vacuum freezing method, an ice growth rate is significantly rapid as compared to the existing freezing method of storing in a freezer (−18 to −70° C.), such that denaturation of protein in the bean curd may be relatively minimized.

In the freeze-drying process of the soft bean curd after the vacuum freezing process, according to the exemplary embodiment of the present invention, the drying is performed in a degree of vacuum of 2.5 to 0.5 torr (absolute pressure), more preferably, 1.5 to 0.5 torr, and the central portion temperature of the soft bean curd is controlled so as not to be over preferably 40° C., more preferably 35° C. while controlling a temperature of a heating plate in a device used for freeze-drying at preferably 10 to 80° C., more preferably 20 to 75° C., thereby allowing denaturation of the protein in the soft bean curd to be minimized.

It is preferable that the soft bean curd subjected to the drying process is vacuum packaged and then distributed for preservation of quality.

The dried soft bean curd manufactured by the drying process has texture more similar to that of the original soft bean curd before drying and is harder and bouncier to thereby have excellent texture in view of the physical properties such as hardness, gumminess, and chewiness of the bean curd after recovery, and the like, as compared to the existing general dried soft bean curd. More specifically, as in a specific Example according to the present invention (Comparative Example 3-2), after the dried soft bean curd manufactured as the above-mentioned method was recovered, physical properties of the soft bean curd recovered after drying were measured under the same conditions as those at the time of measuring the physical properties of the soft bean curd manufactured by the manufacturing method of soft bean curd according to the present invention. As a result, it was confirmed that the recovered soft bean curd had hardness of 50 to 90 g, such that the recovered soft bean curd had hard and elastic properties as compared to control groups (starch-free bean curd or bean curd in which starch was added but not gelatinized) having hardness of 30 to 50 g (See Table 3).

Advantageous Effects

The present invention can provide a method of vacuum freeze-drying soft bean curd without the pre-freezing process, thereby making it possible to provide the drying method of soft bean curd capable of recovering the taste and texture of the soft bean curd before drying as it is.

The present invention can provide a manufacturing method of soft bean curd including a step of adding starch to soy milk and a step of heating the starch so as to be gelatinized in manufacturing the soft bean curd, thereby making it possible to provide soft bean curd having higher quality in view of physical properties such as hardness of the bean curd, and the like, and a manufacturing method thereof. The present invention can provide a stirring method capable of uniformly dispersing the starch in soy milk by using starch in a starch dispersion solution state at the time of performing a step of stirring the starch in the soy milk among the manufacturing processes of the bean curd.

The present invention can provide a manufacturing method of soft bean curd for drying so as to be suitable for manufacturing dried soft bean curd by adding starch and gelatinizing the added starch in manufacturing bean curd, and a manufacturing method of dried soft bean curd by vacuum freeze-drying this soft bean curd for drying.

More specifically, the present invention, which relates to the soft bean curd having higher quality in view of the physical properties such as hardness of the bean curd, and the like, may include the step of adding starch to the soy milk and the step of gelatinizing the added starch during the manufacturing process of the bean curd, in order to provide the soft bean curd that is excellent for being used as soft bean curd for drying in order to manufacture dried soft bean curd and has excellent texture in oneself even though the soft bean curd is not manufactured as the dried soft bean curd.

The soft bean curd having bouncier and more excellent texture may be provided by adding starch and heating the soy milk at a temperature at which a gelatinization reaction thereof is induced to thereby increase water holding capacity of the soft bean curd, and in manufacturing the dried soft bean curd using this soft bean curd, a dried soft bean curd capable of recovering the bouncy texture after drying and removing a spongy texture generated after drying to thereby have excellent physical properties after recovery may be provided.

The starch added to the process may be preferably modified starch. More preferably, an effect of the starch may be maximized by using modified tapioca starch. In addition, the starch is added preferably at a content of 0.1 to 3 weight %, more preferably, 1 weight %, based on the total weight of the soy milk mixed solution, thereby making it possible to prevent split and breakage phenomena of the soft bean curd due to the vacuum freeze-drying process.

At the time of mixing the starch with the soy milk, in order to uniformly disperse the starch in the soy milk, it is preferable that after primarily stirring the starch in dilute water using a known homomixer to prepare a starch dispersion solution, the prepared starch dispersion solution is put into a stirred tank filled with the soy milk, and then a secondary stirring step proceeds. In the primary stirring step, preferably, an antioxidant, for example, vitamin E, vitamin C, tocopherol, green tea extracts, rosemary extracts, or the like, may be further added and stirred. In the case of further adding the antioxidant and stirring, oxidation of fat in the bean curd may be prevented, such that a preservation time of the bean curd may be relatively extended to be longer. In the case of directly injecting the starch into the soy milk, the starch is nonuniformly dispersed in the soy milk, and a particle size of the starch is increased, which may increasing a stirring time and have a negative influence on the physical properties of the bean curd, thereby causing a difference in quality of the bean curd. However, in the case of using the primarily stirred starch dispersion solution as described above, the stirring time of the soy milk and the starch dispersion solution may be shortened, and the bean curd having uniform physical properties may be obtained.

As the coagulant put into the secondarily stirred soy milk mixed solution, since glucono delta lactone (GDL) decomposes a functional group of the starch to inhibit effect of the starch, it is preferable that GDL is not used. More preferably, calcium sulfate may be used as the coagulant.

The soft bean curd manufactured as described above may have harder and bouncier texture than that of the existing general soft bean curd in view of physical properties such as hardness, gumminess, and chewiness of the bean curd, and the like.

In the manufacturing method of dried soft bean curd, preferably, the soft bean curd manufactured as described above is used as the soft bean curd for drying. According to the present invention, in manufacturing the dried soft bean curd, the existing pre-freezing step is not performed, such that denaturation of the protein in the bean curd to be generated by pre-freezing may be prevented, such that the manufacturing method of dried soft bean curd capable of preventing crumbly texture may be provided.

Further, in the freezing process of the soft bean curd, which is a vacuum freezing process performed under reduced pressure, according to the exemplary embodiment of the present invention, a method capable of obtaining high quality soft bean curd may be provided by rapidly vacuum freezing the soft bean curd while controlling a time for passing through a section in which a degree of vacuum is decreased from 4 torr to 2.5 torr (absolute pressure) to be within preferably 30 minutes, more preferably, 15 minutes so that a time for passing through a section in which a central portion temperature of the soft bean curd is decreased from 0 to −5° C. is within preferably 30 minutes, more preferably 15 minutes to thereby minimize denaturation of the protein in the bean curd. That is, in the case of using the vacuum freezing method, an ice growth rate is significantly rapid as compared to the existing freezing method of storing in a freezer (−18 to −70° C.), such that denaturation of protein in the bean curd may be relatively minimized.

Furthermore, in the freeze-drying process of the soft bean curd after the vacuum freezing process, according to the exemplary embodiment of the present invention, the drying is performed in a degree of vacuum of 1.5 to 0.5 torr (absolute pressure), and the central portion temperature of the soft bean curd is controlled so as not to be over preferably 40° C., more preferably 35° C. while controlling a temperature of a heating plate in a device used for freeze-drying at preferably 10 to 80° C., more preferably 20 to 75° C., thereby allowing denaturation of the protein in the soft bean curd to be minimized.

The dried soft bean curd manufactured by the drying process has texture more similar to that of the original soft bean curd before drying and is harder and bouncier to thereby have excellent texture in view of the physical properties of the bean curd such as hardness, gumminess, and chewiness of the bean curd after recovery, and the like, as compared to the existing general dried soft bean curd.

BRIEF DESCRIPTION OF THE DRAWINGS

FIG. 9 is photographs showing a difference in physical properties of the dried soft bean curd according to the kind of coagulant used in the soft bean curd to which starch is added.

DETAILED DESCRIPTION

Figure 1:
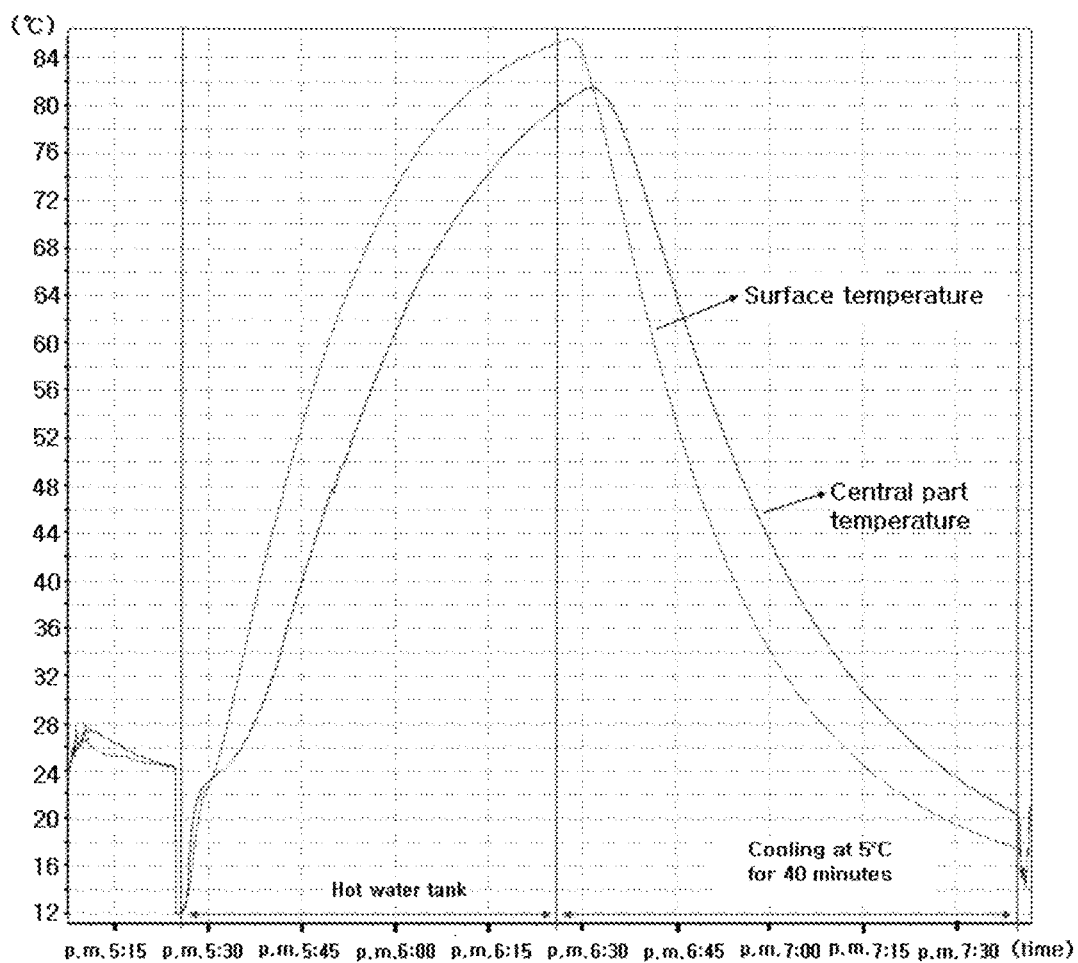
FIG. 1 is a graph obtained by measuring changes in temperature of a surface and a central portion of soft bean curd generated when the soft bean curd to which modified tapioca starch is added is heated at a gelatinization temperature of the modified tapioca starch or more.

Hereinafter, the present invention will be described by the following Examples, Test Examples, and Comparative Test Examples. However, the following Examples, Test Examples, and Comparative Test Examples are only examples of the present invention, but the present invention is not limited thereto.

EXAMPLES

Example 1

Manufacturing Method of Soft Bean Curd Subjected to Gelatinization Reaction of Starch (Manufacturing Method of Soft Bean Curd for Drying)

(1) Step 1: Manufacturing Process of Soy Milk

After stored soy beans were washed to remove foreign materials, distilled water was added to the washed soy bean to thereby immerse the soy beans in the distilled water at room temperature for 12 hours. Distilled water was added again to the soy beans of which immersion was completed and ground by a blender while adjusting a concentration so that brix of the soy milk became 11 brix.

The ground soy beans were filtered through a filter to separate soy bean curd residue and soy milk from each other, and then the separated soy milk was heated and sterilized for 20 minutes while gradually increasing a temperature from 100 to 105° C. A sugar content of the final soy milk subjected to heat treatment was controlled at 10.5 brix, and then the soy milk was cooled to 10° C. or less.

(2) Step 2: Adding Process of Dilute Water, Modified Starch, Antioxidant, and Coagulant and Stirring Process Thereof 476 kg of the cooled soy milk was put into a stirred tank while allowing the tank to be filled from a bottom so as not to generate inner air bubbles. 5 kg of modified tapioca starch (HT2X, product by ABEBE Co., Ltd.) was dispersed in 24 kg of distilled water, and 1 kg of antioxidant (SD-20, tocopherol MIX, product by Yee Yon Chemicals) was added thereto and sufficiently homogenized for 10 minutes using a homomixer, thereby preparing a starch dispersion solution.

The starch dispersion solution was put into the stirred tank filled with 476 kg of 10.5 brix soy milk and sufficiently stirred for 10 minutes. After 1.45 kg of calcium sulfate was well dispersed in 7.25 kg of distilled water as a coagulant and put into the stirred tank, the mixture was stirred together with the soy milk mixed solution.

(3) Step 3: Packaging Process of Soy Milk Mixed Solution in Soft Bean Curd Pouch 508.7 kg of the soy milk mixed solution to which the coagulant was added was divided and put into 1 kg soft bean curd pouches while continuously stirring, thereby performing the packaging process.

(4) Step 4: Heating Process of the Packaged Soft Bean Curd

The packaged soft bean curd was heated so that a temperature of a central portion became 83° C. or more while performing hot water treatment for 1 hour in a hot water bath set at 86° C. to thereby be coagulated.

(5) Step 5: Cooling Process of Coagulated Soft Bean Curd

The coagulated soft bean curd was cooled in cold water at 5° C. for 1 hour so that a central portion temperature of the bean curd became 10° C. or less, and then refrigerated.

It was confirmed that the soft bean curd manufactured as described above had physical properties in the following Test Example 2.

Test Example 1

Change in Temperature of Surface and Central Portion of Soft Bean Curd Heated to Gelatinization Temperature of Starch Added to Soy Milk or More Considering that the gelatinization temperature of the modified starch is 70 to 75° C., the soft bean curd to which the modified tapioca starch (HT2X, product by ABEBE Co., Ltd.) was subjected to hot water treatment using a hot water at 86° C. for 60 minutes so that the temperature (central portion temperature) of the central portion became 80° C. or more in order to allow the central portion of the bean curd to be sufficiently gelatinized. The changes in temperature of the surface and the central portion of the soft bean curd were shown in FIG. 1.

It may be confirmed through the graph of FIG. 1 that in the case of the soft bean curd heated to the gelatinization temperature of the modified tapioca starch or more, the gelatinization process of the starch was generated, such that the temperature of the central portion was relatively slowly increased at the time of heating and rapidly decreased after heating. When the heating was performed for 30 minutes by setting the temperature of the hot water bath at 86° C., the temperature of the central portion did not arrive at 60° C., such that the modified tapioca starch was not sufficiently gelatinized, and when the heating was performed for about 1 hour, the central portion temperature was over 80° C., such that the modified tapioca starch could be sufficiently gelatinized.

Comparative Test Example 1

Change in Temperature of Surface and Central Portion of Existing General Soft Bean Curd to which Starch is not Added The existing general soft bean curd (Malgun Kong soon-dubu, product by Malgunmutae Co., Ltd.) was purchased, and changes in temperature of a surface and a central portion of the soft bean curd at the time of performing hot water treatment on this soft bean curd were measured.

Figure 2:
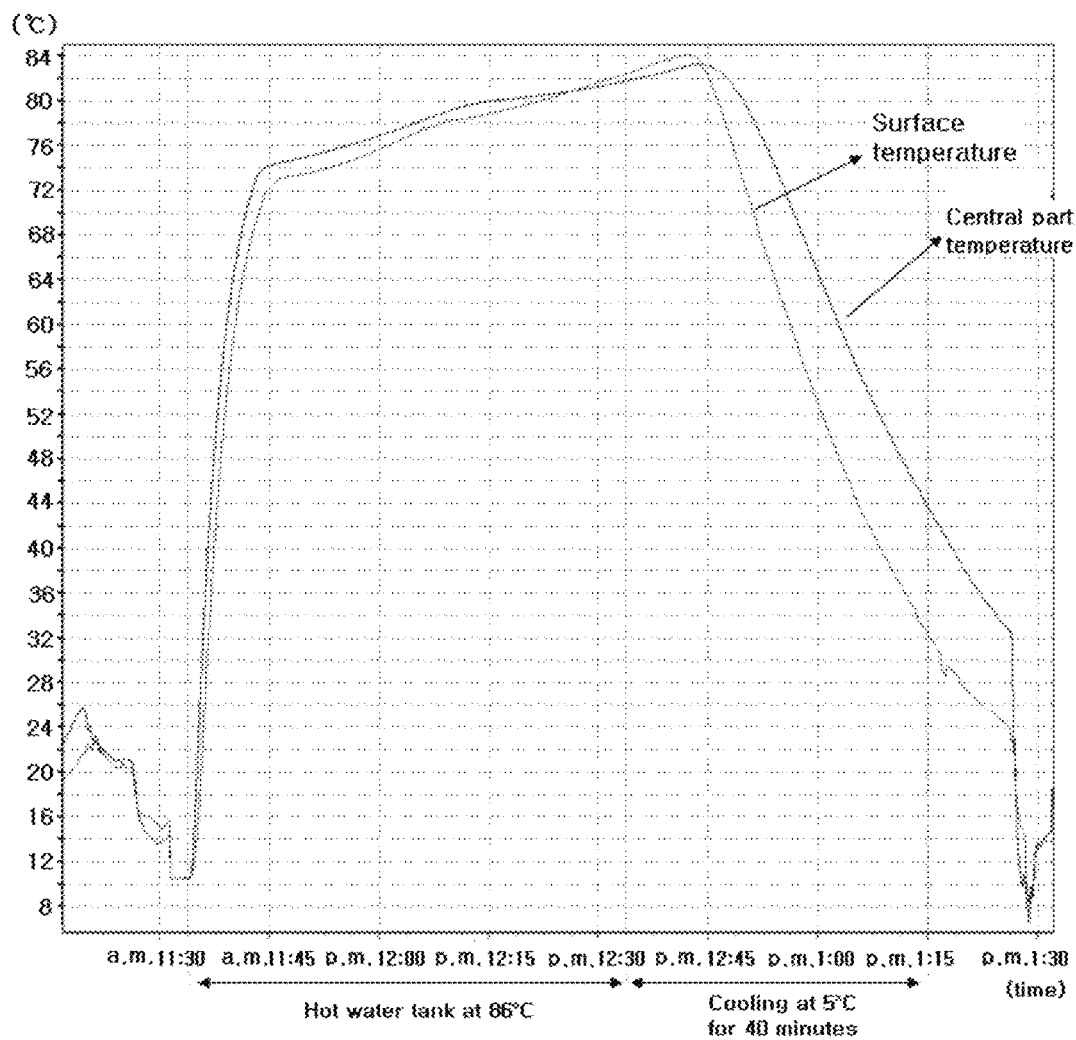
FIG. 2 is a graph obtained by measuring changes in temperature of a surface and a central portion of soft bean curd at the time of performing hot water treatment on the existing general soft bean curd that is not subjected to a gelatinizing process of starch during a step of heating the soft bean curd in a manufacturing method of soft bean curd.

Referring to FIG. 2 showing the measurement results, the temperature of the central portion of the soft bean curd was relatively rapidly increased at the time of heating and slowly decreased after heating, as compared to FIG. 1.

Test Example 2

Measurement of Physical Properties of Soft Bean Curd Manufactured as in Example 1

After manufacturing soft bean curd according to the method of Example 1, physical properties of the soft bean curd were measured using a texture analyzer (model name: TA-XT Plus, product by MHK Trading Company). Measurement of the physical properties was performed under the following conditions.

Conditions were set as follows.

Probe: cylindrical shape having a diameter of 20 mm

Speed at which the probe descends to a sample (pre-test speed): 1.00 mm/sec;

Speed at which the probe contacts a surface of the sample and then infiltrates into the sample (test speed): 5.00 mm/sec;

Speed at which the probe infiltrated into the sample and returns to an original position (post-test speed): 5.00 mm/sec;

Target mode of the probe: distance;

Distance at which the probe recognizes the surface of the sample and infiltrated through the sample: 5.000 mm;

Condition for allowing the probe to recognize the sample (Trigger type): force; and Minimum force for allowing the probe to recognize the sample (Trigger force): 5.0 g.

The physical property values of the soft bean curd manufactured by the method of Example 1 measured under the above-mentioned conditions were shown in the following Table 1.

TABLE 1

| Central portion temperature (° C.) | Hardness (g) | Adhesiveness (g · s) | Cohesiveness | Gumminess | Chewiness | Amount of Syneresis (%) |
|---|---|---|---|---|---|---|
| 83.22 | 128.04 | 0.97 | 0.85 | 76.58 | 73.52 | 7.01 |

In Table 1, hardness indicates force required in the sample for arriving at the desired deformation, and adhesiveness indicates force in the probe for being separated again from the sample after infiltrating through the sample. In the case in which an adhesiveness value is larger than a cohesiveness value, the sample may be partially adhered to the probe. Cohesiveness indicates force required in an object for maintaining its original shape, and in the case in which the cohesiveness value is larger than the adhesiveness value, the sample is not adhered to the probe. Gumminess indicates a property of making a semi-solid sample to a state ready for swallowing and is calculated as the product of hardness and cohesiveness. Chewiness indicates a property of making a solid sample to a state ready for swallowing.

Comparative Test Example 2-1

Measurement of Physical Properties of Soft Bean Curd that was not Subjected to the Gelatinization Reaction of Starch A composition of the soft bean curd was the same as in Example 1, but in order to confirm the physical properties of the soft bean curd in which the gelatinization reaction of the starch in step 4 of Example 1 was not carried out, sampling was sequentially performed at six timing points at which the temperature of the central portion of the soft bean curd are different from each other in step 4 of Example 1, and then physical properties of each sample were measured under the same conditions as in Test Example 2. The measurement values were shown in the following Table 2 together with data of Test Example 2.

TABLE 2

| | Central portion temperature (° C.) | Hardness (g) | Adhesiveness (g · s) | Cohesiveness | Gumminess | Chewiness | Amount of Syneresis (%) |
|---|---|---|---|---|---|---|---|
| 1th | 47.57 | 25.96 | 0.88 | 0.55 | 14.5 | 12.76 | 18.02 |
| 2th | 51.28 | 26.51 | 0.905 | 0.56 | 14.97 | 13.54 | 20.58 |
| 3th | 55.82 | 33.69 | 0.91 | 0.56 | 18.95 | 17.25 | 11.10 |
| 4th | 64.9 | 53.46 | 0.945 | 0.69 | 37.04 | 35 | 9.44 |
| 5th | 74.3 | 62.85 | 0.96 | 0.77 | 48.39 | 46.45 | 7.49 |
| 6th | 83.22 | 128.04 | 0.97 | 0.85 | 76.58 | 73.52 | 7.01 |
| Correlation coefficient | | 0.93 | 0.97 | 0.99 | 0.99 | 0.98 | 0.87 |

Considering that the gelatinization temperature of the tapioca starch is 70 to 75° C., since the gelatinization reaction of the starch may be sufficiently generated only in the case in which the temperature of the central portion of the soft bean curd becomes about 80° C. or more, in Comparative Test Example 2, only the sixth sample in which the temperature of the central portion of the soft bean curd was 83.22° C. may correspond to the soft bean curd subjected to the gelatinization reaction of the starch.

Referring to Table 2, it may be confirmed that the physical properties of the manufactured soft bean curd had a significant correlation with gelatinization of the starch, and particularly, hardness, cohesiveness, gumminess, and chewiness of the soft bean curd had a significant correlation.

In addition, an amount of syneresis is a value obtained by measuring an amount of water discharged from bean curd during the same time and dividing this measured amount by an initial weight to express this value as a percentage after manufacturing the bean curd and cutting the manufactured bean curd so as to have a uniform size. Generally, it was confirmed that a degree of syneresis was decreased depending on the gelatinization degree of the central portion. Therefore, it may be judged that the starch serves to hold moisture present in the bean curd while being gelatinized to thereby decrease the amount of syneresis.

That is, it may be confirmed that the starch added to the soft bean curd caused the gelatinization reaction, such that the soft bean curd became harder and more elastic as compared to the soft bean curd manufactured without the gelatinization reaction, thereby manufacturing high quality soft bean curd that was advantageous for delivery and storage due to high shape retention and had bouncier and good chewable texture.

Figure 3:
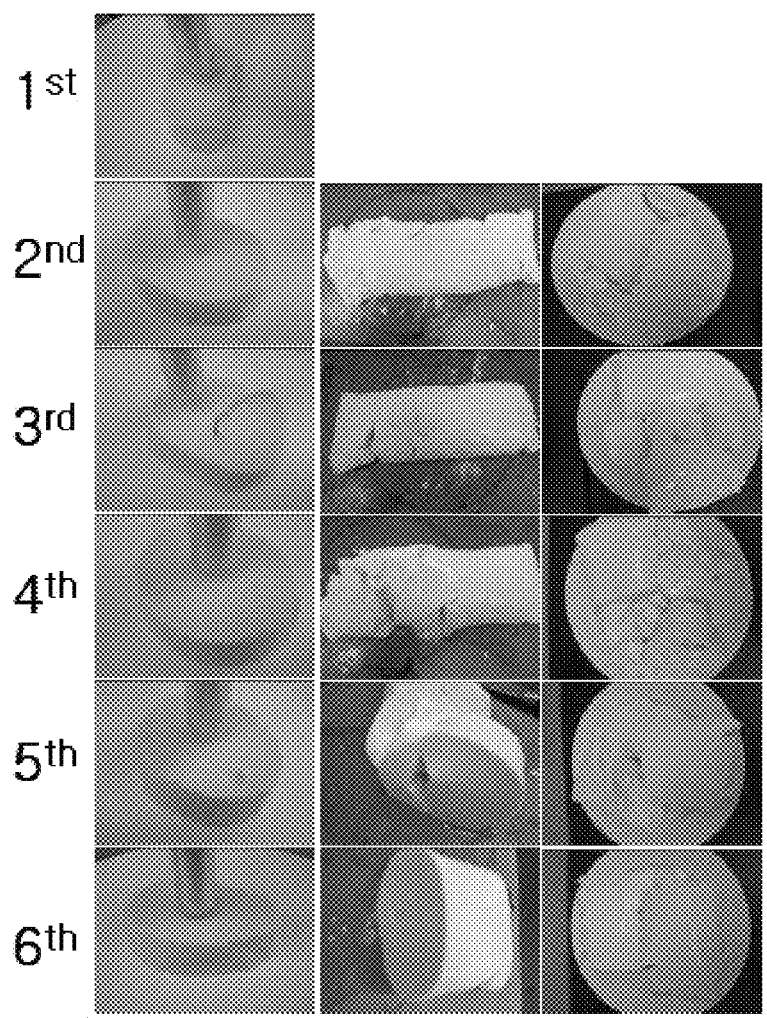
FIG. 3 is photographs showing a difference in physical properties of the soft bean curd according to the temperature of the central portion of the soft bean curd at the time of performing the hot water treatment on the soft bean curd in a manufacturing method of the soft bean curd to which starch is added.
Figure 4:
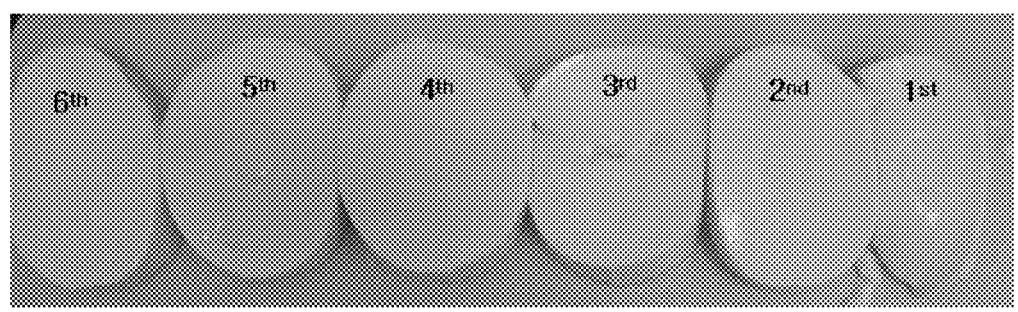
FIG. 4 is photographs showing a difference in physical properties of the soft bean curd according to the temperature of the central portion of the soft bean curd at the time of performing the hot water treatment on the soft bean curd in a manufacturing method of the soft bean curd to which starch is added, together with FIG. 3.

Each of the photographs at the time of and after measuring the physical properties of the first to sixth samples was shown in FIGS. 3 and 4.

Comparative Test Example 2-2

Figure 5:
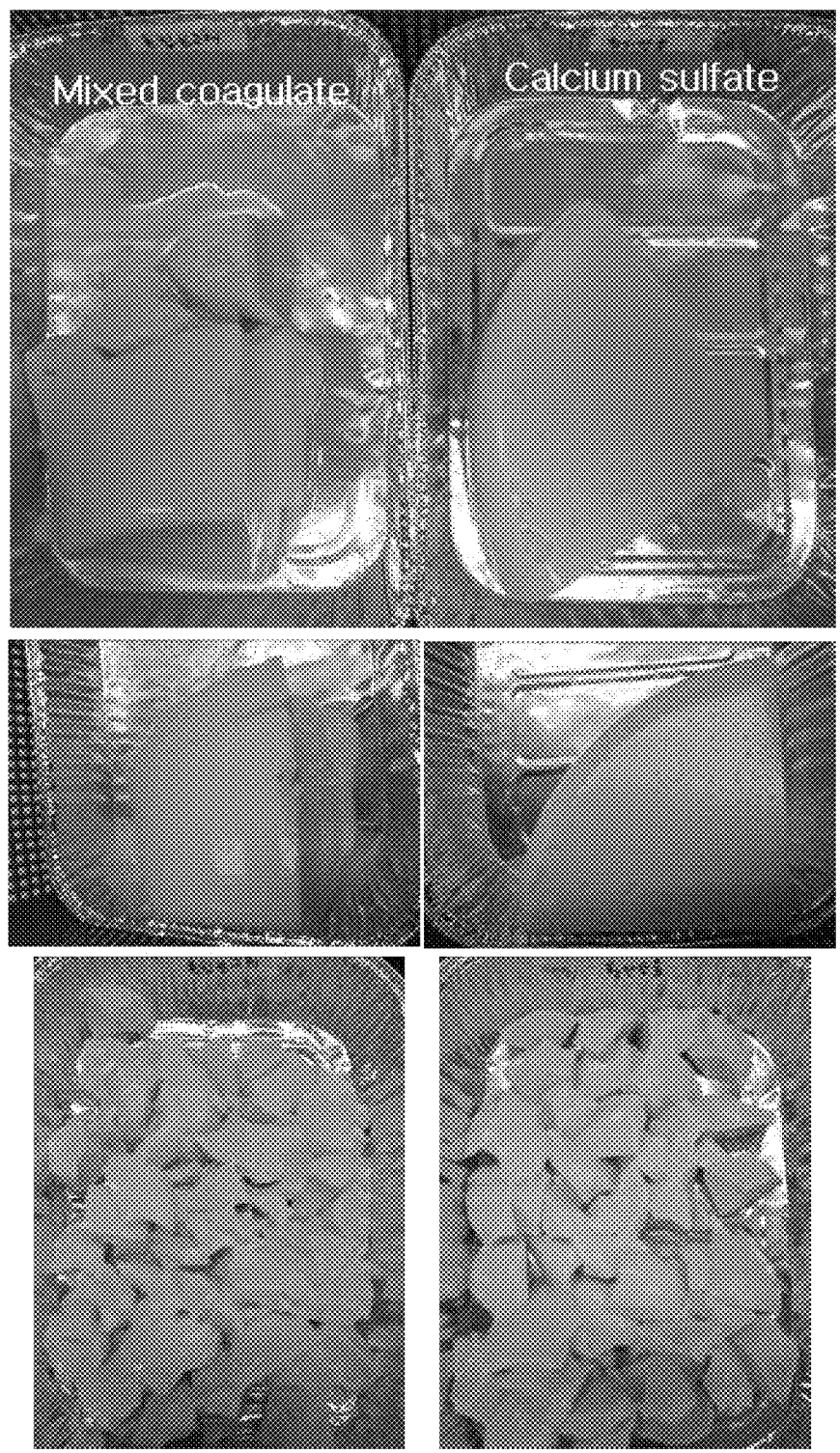
FIG. 5 is photographs showing a difference in physical properties of the soft bean curd according to the kind of coagulant used in the soft bean curd to which starch is added.

Comparison of Physical Properties of Soft Bean Curd According to the Kind of Coagulant Used in Soft Bean Curd to which Starch is Added The soft bean curd was manufactured by the same method as in Example 1 except for changing the kind of coagulant used therein, and physical properties of each soft bean curd were compared. More specifically, physical properties of soft bean curd manufactured using 1 kg of calcium sulfate and soft bean curd manufactured using 1 kg of a mixed coagulant in which calcium sulfate, magnesium chloride, and GDL was mixed with each other at a ratio of 8:2:4 as the coagulant in soy milk to which 5 kg of the modified tapioca starch (HT2X, product by ABEBE Cor., Ltd.) was added were compared with each other. The test results were shown in FIG. 5.

As the test result, in the case of using calcium sulfate as the coagulant, soft bean curd having the physical properties of the Test Example 2 was manufactured, but in the case of using the complex coagulant, soft bean curd having physical properties similar to those of the existing general soft bean curd in which properties of the starch disappeared as in the soft bean curd in which starch was not used or the soft bean curd that was not heated at the gelatinization temperature of the starch or more in step 4 of Example 1 even though the starch was added.

More specifically, the soft bean curd manufactured using calcium sulfate had properties of the high quality soft bean curd from which a significantly small amount of a liquid was discharged and of which a bouncy appearance was seen by the naked eyes and the strength was stronger and the texture was softer than those of the existing soft bean curd, but in the soft bean curd manufactured using the complex coagulant, a large amount of yellowish liquid was discharged therefrom, mushy texture similar to that of the general soft bean curd in which starch was not used was obtained, and the strength was weak. The reason of obtaining these properties in the soft bean curd manufactured using the complex coagulant was judged as follows. The GDL contained in the complex coagulant decomposed the functional group of the starch added to the soy milk to thereby inhibit the effect of the starch by decreasing pH.

Example 2

Drying Method of Soft Bean Curd by Vacuum Freezing Drying Method

A drying process of soft bean curd was performed on the soft bean curd manufactured by the manufacturing method in Example 1.

(1) Step 1: Cutting Process of Soft Bean Curd

The soft bean curd refrigerated in Example 1 was picked up from the pouch and pretreated by performing primary, secondary, and tertiary cutting thereon so as to have an amorphous shape in which width, length, and height of the soft bean curd were about 5 cm or less, respectively.

(2) Step 2: Vacuum Freezing Process of Cut Soft Bean Curd

After cutting the soft bean curd, 4 kg of the cut soft bean curd was individually put into a dry pan at one time and appropriately spread so as not to be overlapped. Thereafter, the dry pan was inserted into a freeze-drying chamber in a state in which a central portion temperature of the soft bean curd was maintained at 10° C. or less. In order to perform vacuum freezing, a time for passing through a section in which a degree of vacuum was decreased from 4 torr to 2 torr was controlled within 15 minutes by operating a vacuum pump, such that rapid freezing for maximally decreasing a time for passing through a section in which the central portion temperature of the soft bean curd was decreased from 0 to −5° C. was performed.

(3) Step 3: Freeze-Drying Process of Vacuum Frozen Soft Bean Curd

Based on −15° C. at which the freezing was completed, the freeze-drying was performed within a degree of vacuum of 2 to 0.5 torr while controlling a temperature of a heating plate at 10 to 75° C. After 30 hours, the drying was completed, and the dried soft bean curd was removed from the pan and packaged.

Comparative Test Example 3-1

Comparison of Freezing Quality of Vacuum Frozen Bean Curd and Bean Curd Put Into Freezer to Thereby be Frozen by the Existing Method A test for comparing freezing quality of the bean curd frozen by the vacuum freezing method in step 2 of Example 2 and the bean curd put into a freezer to thereby be frozen by the existing method was conducted.

Figure 6:
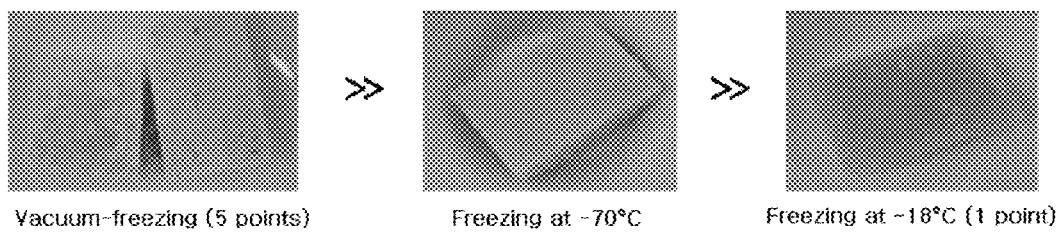
FIG. 6 is photographs showing a difference in freezing quality between vacuum frozen bean curd and bean curd put into a freezer to thereby be frozen by the existing method.

The comparison results of the freezing quality were shown in FIG. 6.

In the case of the vacuum frozen bean curd, yellow stains were partially generated, and protein was slightly denatured, but as compared to the cases in which the bean curd frozen in a freezer at −70° C. became entirely yellowish and the bean curd frozen in a freezer at −18° C. became significantly yellow, it was judged that in the vacuum frozen bean curd, a small amount of protein was denatured, and this denaturation did not cause a significant difference from the original bean curd in view of texture after recovery.

In the case in which a maximum texture score of original bean curd was 5 points, when quality of each frozen bean curd was relatively compared, the texture score of the vacuum frozen bean curd obtained by sensory evaluation after defrosting was 5 points, such that there was almost no difference from the original bean curd, but the texture scores of the bean curd frozen in the freezer at −70° C. and the bean curd frozen in the freezer at −18° C. were evaluated as 2.5 points and 1 point, respectively.

The reason may be that in the case of the vacuum freezing method, since heat was instantly removed from moisture in the bean curd when water was vaporized, the ice growth rate was significantly rapid as compared to the existing cooling method of storing the freezer, such that denaturation of the protein in the bean curd was small.

Comparative Test Example 3-2

Measurement of Physical Properties of Soft Bean Curd Subjected to Gelatinization Reaction and Soft Bean Curd not Subjected to Gelatinization Reaction Before and after Drying The soft bean curd was manufactured by the manufacturing method of Example 1, but as in Comparative Test Example 2-1, sampling was sequentially performed at six timing points at which the temperature of the central portion of the soft bean curd are different from each other in step 4 of Example 1, and then physical properties of each sample were measured under the same conditions as in Test Example 2. Thereafter, after the six samples were manufactured as dried soft bean curd by the method in Example 2, physical properties of each soft bean curd recovered by pouring water thereon were measured under the same conditions as in Test Example 2. The measurement values were shown in the following Table 3.

TABLE 3

| | | 1th | 2th | 3th | 4th | 5th | 6th | Correlation | |
| | | \multicolumn{6}{c}{Central portion temperature (° C.)} | coefficient | |
| | | 27.72 | 30.51 | 35.44 | 46.87 | 59.97 | 83.12 | | Control group |
| | | \multicolumn{6}{c}{Sample time (min)} | | |
| | | 12 | 14 | 17 | 24 | 34 | 60 | 0.98 | (starch-free) |
| Physical properties of soft bean curd before drying | Hardness (g) | 25.61 | 34.44 | 53.87 | 88.09 | 100.56 | 143.28 | 0.98 | 91.95 |
| | Adhesiveness (g · s) | 0.82 | 0.86 | 0.95 | 0.93 | 0.97 | 1.01 | 0.85 | 0.96 |
| | Cohesiveness | 0.61 | 0.61 | 0.79 | 0.79 | 0.85 | 0.83 | 0.76 | 0.83 |
| | Gumminess | 15.63 | 21.16 | 42.50 | 69.24 | 85.66 | 118.41 | 0.98 | 76.58 |
| | Chewiness | 12.82 | 18.30 | 40.58 | 64.74 | 83.51 | 120.19 | 0.99 | 73.52 |
| Physical properties of soft bean curd recovered | Hardness (g) | 36.99 | 40.19 | 44.16 | 50.46 | 57.30 | 60.06 | 0.96 | 47.70 |
| | Adhesiveness (g · s) | 0.91 | 0.83 | 0.92 | 0.91 | 0.85 | 0.87 | 0.24 | 0.85 |
| | Cohesiveness | 0.74 | 0.68 | 0.70 | 0.71 | 0.73 | 0.67 | 0.39 | 0.73 |
| | Gumminess | 27.41 | 27.36 | 30.77 | 35.85 | 42.05 | 40.06 | 0.88 | 43.63 |
| | Chewiness | 24.80 | 22.71 | 28.30 | 32.62 | 35.53 | 34.85 | 0.86 | 29.44 |

As shown in Table 3, in the case of the soft bean curd (particularly, 5th sample) that was not heated to the gelatinization temperature of the starch or more at the central portion of the bean curd although the starch was added thereto, it was confirmed that physical properties similar to those of the starch free soft bean curd tested as the control group were obtained before and after drying.

In the case of the 6th sample heated to the gelatinization temperature or more, it was confirmed that in the soft bean curd recovered after drying as well as the soft bean curd before drying, the hardest property (hardness) and the bounciest texture (gumminess and chewiness) were obtained, such that the high quality soft bean curd having excellent properties was manufactured.

Comparative Test Example 3-3

Comparison of Physical Properties of Soft Bean Curd Manufactured by Adding Modified Tapioca Starch and Dried Soft Bean Curd Manufactured by Adding Another Starch, Gum, Sugar, and Enzyme, Respectively, after Recovery Physical properties of soft bean curd manufactured by adding the modified tapioca starch according to the manufacturing method in Examples 1 and 2 and soft bean curd manufactured by adding another starch, gum, sugar, and enzyme, respectively, were compared with each other. Yam powder was used as another starch, curdlan and cellulose gum were used as the gum, trehalose, sorbitol, maltodextrin, and poly dextrose were used as the sugar, and transglutaminase (TG) was used as the enzyme.

In addition, dried soft bean curd was manufactured using hydroxy propyl methyl cellulose used as a food additive, soy milk powder, and hyaluronic acid according to the manufacturing method of Examples 1 and 2. With respect to each dried soft bean curd manufactured as described above, texture of the bean curd after recovery and a split property were scored based on a 5 points scale.

Figure 7:
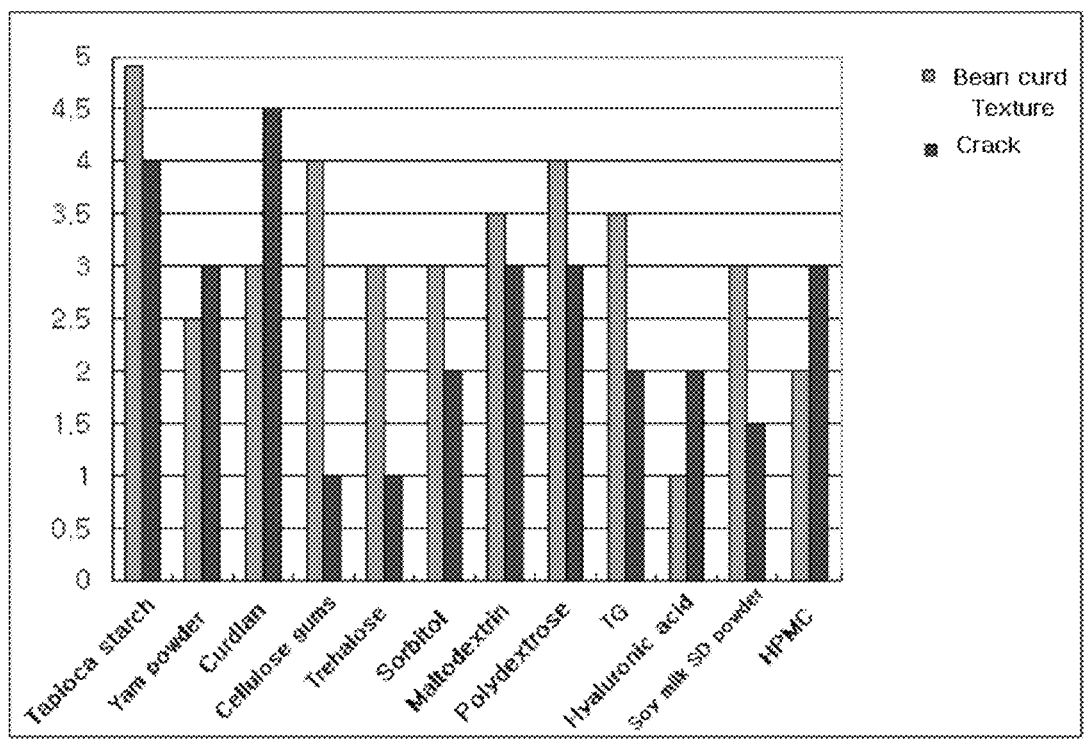
FIGS. 7 and 8 are graphs showing a difference in physical properties after recovery between soft bean curd manufactured by adding the modified tapioca starch and dried soft bean curd manufactured by adding other starches, gums, sugars, and enzymes, respectively.
Figure 8:
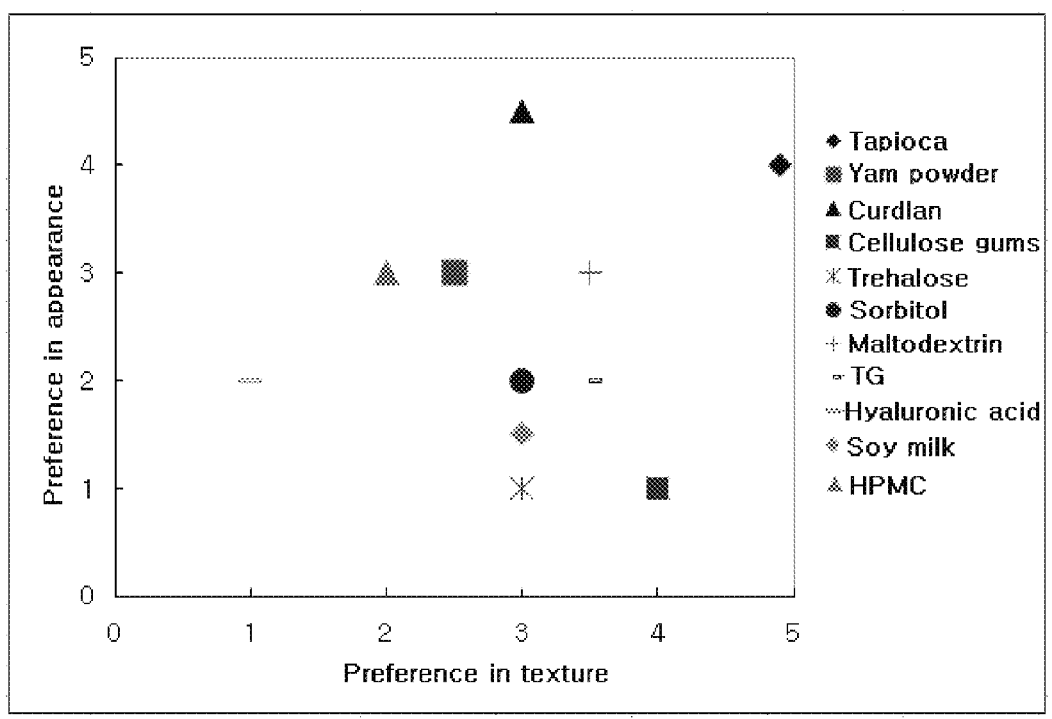

Comparison and evaluation results of the physical properties were shown in Table 4 and FIGS. 7 and 8.

TABLE 4

|  | texture | split |
| --- | --- | --- |
| Tapioca starch | 4.9 | 4 |
| Yam powder | 2.5 | 3 |
| Curdlan | 3 | 4.5 |
| Cellulose gum | 4 | 1 |
| Trehalose | 3 | 1 |
| Sorbitol | 3 | 2 |
| Maltodextrin | 3.5 | 3 |
| Poly dextrose | 4 | 3 |
| Transglutaminase (TG) | 3.5 | 2 |
| Hyaluronic acid | 1 | 2 |
| Soy milk powder | 3 | 1.5 |
| Hydroxy proryl methyl cellulose (HPMC) | 2 | 3 |

Texture index

| Score | Physical properties |
| --- | --- |
| 5 | Texture of original soft bean curd: bouncy texture of curd was felt, and the bean curd did not easily break. |
| 4 | Lumps were slightly formed in the bean curd, but bouncy and soft texture of the curd was similar to that of the original bean curd. |
| 3 | A weak spongy feeling was felt, lumps were partially present therein, but the curd was soft. |
| 2 | A significantly strong spongy feeling (significantly crumbly texture) was felt, and a soft feeling was not felt (similar to Yuba). |
| 1 | There was no chewing texture, and the texture was not texture of the bean curd. |

Appearance (split) index

| Score | Physical properties |
| --- | --- |
| 5 | The surface was smooth (there was no sponge phenomenon), and the bean curd did not split and break. |
| 4 | The bean curd brok, but did not split. In addition, in the case of lifting the bean curd using a spoon, other portions thereof were not split, depending on the presence or absence of a burst. |
| 3 | The bean curd broke and slightly finely split. In addition, in the case of lifting the bean curd using a spoon, other portions thereof split and dropped, depending on the presence or absence of a burst. |
| 2 | The bean curd broke and a fine split was easily observed. In addition, in the case of lifting the bean curd using a spoon, the bean curd was mushy, depending on the presence or absence of a burst. |
| 1 | The bean curd significantly broke part and split. Air bubbles and pores were present in the bean curd, and the bean curd scattered, depending on the presence or absence of a burst. |

Comparing the physical properties of each soft bean curd, the soft bean curd manufactured using the modified tapioca starch had the highest score almost near to 5 points in view of the texture of the bean curd. In view of the split of the bean curd, the soft bean curd manufactured using curdlan had the highest score, but in the case of using curdlan, the texture of the bean curd was significantly deteriorated, such that curdlan was evaluated as inappropriate for being used in the soft bean curd.

As a result of synthetically comparing the appearance and texture preference, the bean curd manufactured using the modified tapioca starch was evaluated as the most excellent.

Comparative Test Example 3-4

Comparison of Physical Properties of Dried Soft Bean Curd According to the Kind of Coagulant Used in Soft Bean Curd to which Starch is Added The dried soft bean curd was manufactured by the same manufacturing method as in Examples 1 and 2 while changing the kind of coagulant used therein, and physical properties of each dried soft bean curd were compared with each other. In detail, soft bean curds manufactured by adding 5 kg of modified tapioca starch (HT2X, product by ABEBE Cor., Ltd.) to soy milk and using each of 1 kg of calcium sulfate and 1 kg of GDL as a coagulant according to the manufacturing method of Example 1 and soft bean curd were dried according to the method of Example 2, and then physical properties of each dried soft bean curd were compared. Thereafter, physical properties of soft bean curds recovered by pouring water thereon were also compared. The comparison results were shown in FIG. 9.

In comparing the physical properties, the soft bean curds were prepared so as to have different sizes (width×length×height: 1 cm×1 cm×1 cm, 3 cm×3 cm×3 cm, and 5 cm×5 cm×5 cm), and whether or not the physical properties of the soft bean curd was changed according to the size was also compared.

As shown in FIG. 9, it may be confirmed that in the case of using GDL as the coagulant, first, the bean curd tasted slightly sour due to a sour taste derived from GDL itself, which was not sensuously good, and the pH was decreased to cause decomposition of the functional group of the starch, which offset the gelatinization effect of the starch, such that the bean curd had a crumbly texture and significantly split.

Comparison Test of Sensory Properties

Comparison of Sensory Properties of the Existing Dried Soft Bean Curd and the Dried Soft Bean Curd Manufactured by the Manufacturing Method of Examples 1 and 2

A test for comparing sensory properties of the dried soft bean curd sold on the market (Donglimfood Chodangsoodubu Product) and the dried soft bean curd manufactured by the manufacturing method of Examples 1 and 2 according to the present invention after recovery was conducted.

The Donglimfood Chodangsoondubu Product was a dried soft bean curd manufactured by the existing method, that is, a manufacturing method not including a step of inducing the gelatinization reaction of the starch, and dried by the existing method, that is, freeze-dried by a freeze-drying method of the soft bean curd that was pre-frozen (or cooled up to a immediately before freezing state).

The sensory test was performed on 50 housewives with ages between 25 to 49 by a method of instantly preparing and eating an instant cup soft bean curd stew, which is a finished product of the dried soft bean curd. In the case of Donglimfood Chodangsoondubu, it was composed of dried bean curd, dried vegetable flakes, and liquid soup in a container and sold, such that the sensory test was performed by pouring hot water into the container, and in the case of the dried soft bean curd manufactured by the manufacturing method of Examples 1 and 2 according to the present invention, the sensory test was performed by adding seasoning for soft bean curd stew (product by Dadam Corp.) to soft bean curd in a container and pouring hot water into the container.

Results of the sensory test were shown in the following Table 5. The score was evaluated based on a 5-points scale.

TABLE 5

| Evaluation category | Donglimfood Chodangsoondubu | Soft bean curd of Examples 1 and 2 |
| --- | --- | --- |
| Overall preference for bean curd | 3.04 | 4.15 |
| Preference for appearance of bean curd | 2.88 | 4.04 |
| Preference for size of bean curd | 2.87 | 4.03 |
| Preference for taste of bean curd | 3.21 | 4.04 |
| Preference for texture of bean curd | 3.05 | 4.11 |
| Preference for softness of bean curd | 2.80 | 4.29 |
| Preference for entire flavor of soup | 3.14 | 3.71 |
| Preference for taste of soup | 2.98 | 3.61 |
| Overall preference for stew | 3.15 | 3.92 |
| Preference for appearance of stew | 2.86 | 4.00 |

As a result of the sensory test, in all of the evaluation categories, the dried soft bean curd manufactured by the manufacturing method of Examples 1 and 2 according to the present invention was more excellent. Considering that the dried soft bean curd manufactured by the manufacturing method of Examples 1 and 2 according to the present invention was evaluated to have significantly high sensory properties in view of the preferences for texture and softness of the bean curd, it was confirmed that in the case of manufacturing the dried soft bean curd manufactured by the manufacturing method of Examples 1 and 2 according to the present invention, the product having excellent texture closer to that of the original bean curd before drying may be manufactured as compared to the existing method.

Example 3

Preparing Method of Starch Dispersion Solution

In adding the starch and the antioxidant to the soy milk at the time of manufacturing bean curd, in order to uniformly disperse the starch in the soy milk, the starch dispersion solution was prepared.

5 kg of modified tapioca starch (HT2X, product by ABEBE Cor., Ltd.) was dispersed in 24 kg of distilled water, and 1 kg of an antioxidant (SD-20, product by Yee Yon Chemicals) was added thereto and sufficiently homogenized for 10 minutes using a homomixer, thereby preparing a starch dispersion solution.

It was confirmed that in the case of injecting the starch dispersion solution into the soy milk to stir the mixture, a stirring time may be shortened, and the starch was uniformly dispersed, such that bean curd having uniform physical properties may be obtained.

Comparative Test Example 4

Comparison of Dispersion Degrees in the Case of Directly Applying Starch to Soy Milk to Stir the Mixture and the Case of Applying Starch Dispersion Solution to Stir the Mixture In order to compare dispersion degrees of the starch in the case of directly applying the starch to the soy milk to stir the mixture and the case of applying the starch dispersion solution to stir the mixture in a process of adding the starch to the soy milk to stir the mixture, comparative test was performed under the following experimental conditions.

After 470 g of 10 brix soy milk was purchased in the market and put into two beakers, respectively, 30 g of starch dispersion solution (5 g of modified tapioca starch+25 g of dilute water) was added thereto by the same method as in Example 3 to control a sugar content of 500 g of final soy milk mixed solution containing 1 weight % of starch at 9.5 brix in one beaker, and 5 g of the modified tapioca starch and 25 g of dilute water were directly added to the soy milk to similarly control a sugar content of 500 g of final soy milk mixed solution containing 1 weight % of starch at 9.5 brix. Thereafter, each of the final soy milk mixed solutions was stirred at 100 rpm for 10 minutes, thereby performing the test.

Comparison of the dispersion degree of the starch in the soy milk in each case was performed by a method of irradiating light to both of the beakers through a Turbiscan LAB ('Leanontech' Corp.) and measuring light transmittance and backscattering to measure positions, size, and degrees of insoluble particles in the liquid. Measurement of the light transmittance and backscattering was performed by scanning every 2 minutes for 60 minutes.

Figure 10:
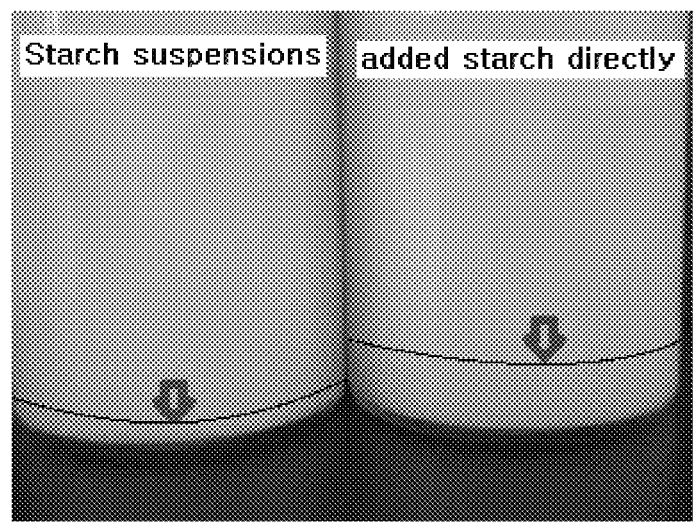
FIG. 10 is photographs showing a difference between the case of adding starch in a starch dispersion solution state and the case of directly adding starch in a process of adding starch to soy milk.

A photograph of the soy milk to which the starch dispersion solution was added and a photograph of the soy milk to which the starch was directly added were compared in FIG. 10. In addition, the backscattering result measured using the Turbiscan LAB apparatus was shown in FIG. 11, and a result of enlarging and comparing FIG. 11 was shown in FIG. 12.

As shown in FIG. 10, it may be confirmed that in the case of the soy milk to which the starch dispersion solution was added, a starch precipitation layer was formed almost at an end portion of a lower portion of the beaker (at a height of about 2 mm from the bottom of the beaker), and in the case of the soy milk to which the starch was directly added, a starch precipitation layer was formed at a height of about 8 mm from the bottom of the beaker. This means that in the case of directly adding the starch, starch particles in the soy milk were formed to have a significantly large size.

Figure 11:
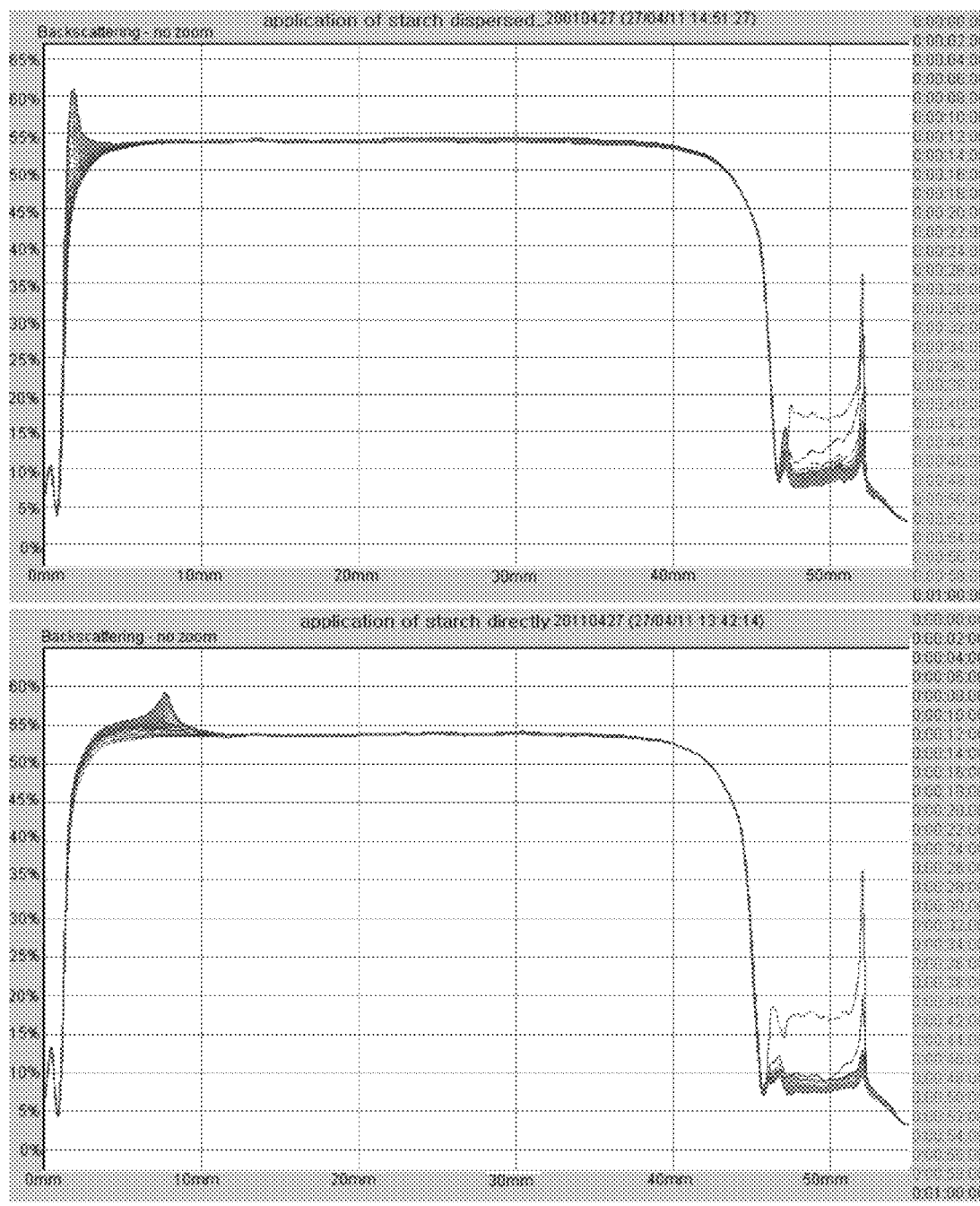
FIGS. 11 and 12 are graphs showing a difference in backscattering degree between soy milk to which starch is added and stirred in the starch dispersion solution state and soy milk to which starch is directly added and stirred in the process of adding starch to soy milk.

The backscattering results measured using the Turbiscan LAB apparatus indicates that as shown in FIG. 11, in the case (upper graph of FIG. 11) of the soy milk to which the starch dispersion solution was added, the highest backscattering result was recorded at a position having a height of about 2 mm from the bottom of the beaker, and in the case (lower graph of FIG. 11) of the soy milk to which the starch was directly added, the highest backscattering result was recorded at a position having a height of about 8 mm from the bottom of the beaker, such that the starch precipitation layers were formed in the vicinity of these points, respectively. This means that in the case of directly adding the starch, the starch was not uniformly dispersed in the soy milk, but the starch particles coagulated with each other, such that particles having a larger particle size were formed.

Figure 12:
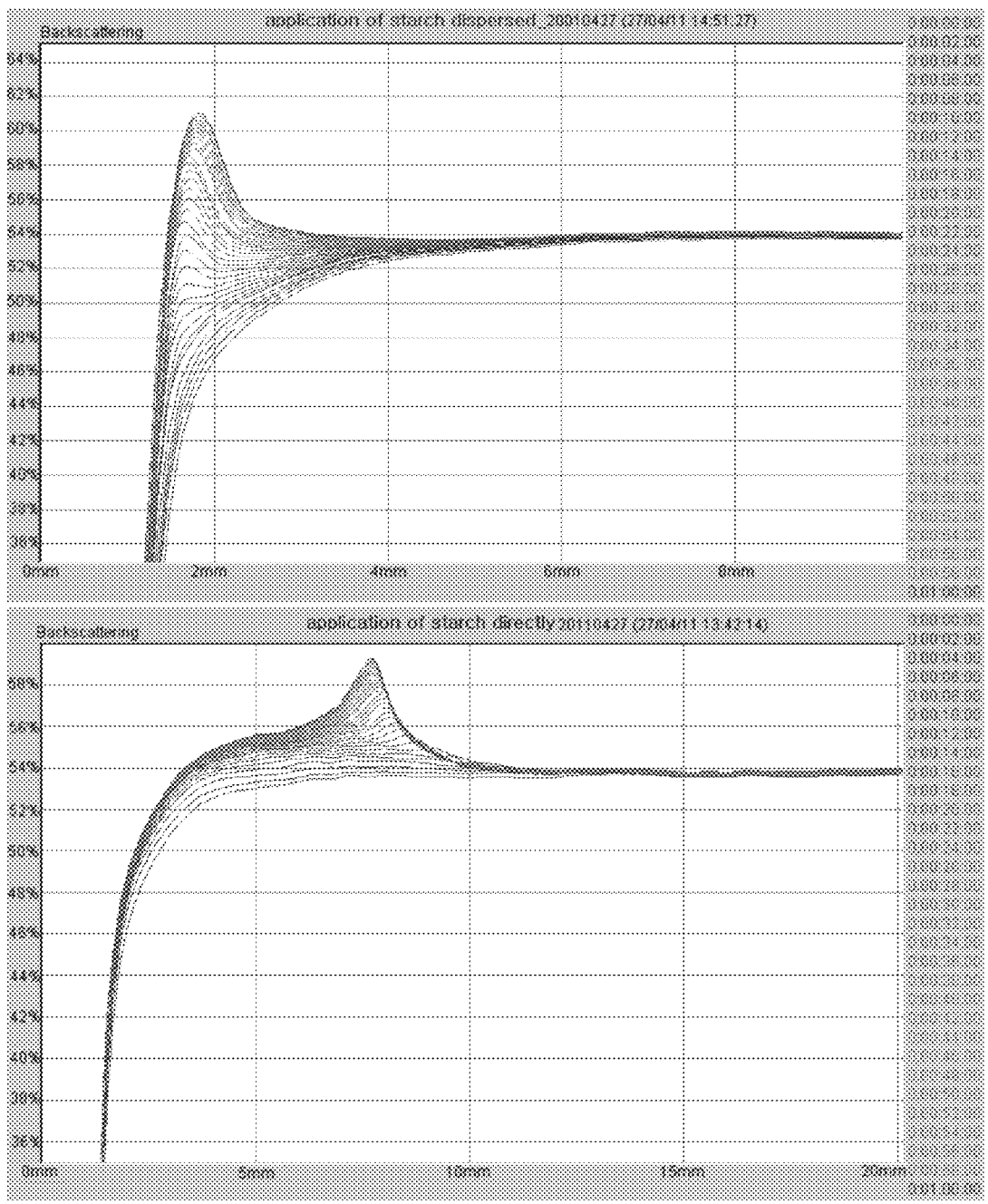

Referring to FIG. 12 showing a result of enlarging and comparing FIG. 11, in the case (upper graph of FIG. 12) of adding the starch dispersion solution, after about 18 minutes of scanning by the Turbiscan LAB apparatus, the backscattering value started to be differently measured while remarkably forming a peak at the lower portion of the beaker, but in the case (lower graph of FIG. 12) of directly adding starch, after about 10 minutes of scanning, peaks started to be formed. This means that in the case of directly adding the starch, the starch was not uniformly dispersed in the soy milk and remained in a large particle state, such that a precipitation rate of the starch particle was faster than that of the starch particle in the case of adding the starch dispersion solution.

Therefore, it may be confirmed from the above-mentioned results that the case of adding the starch dispersion solution to the soy milk to stir the mixture, the starch were uniformly dispersed in the soy milk in a small particle state, as compared to the case of directly adding the starch.

The invention claimed is:

1. A vacuum freeze-drying method of soft bean curd, comprising:
   a) vacuum-freezing soft bean curd to produce frozen soft bean curd; and
   b) freeze-drying the frozen soft bean curd produced from step a) to produce dried soft bean curd,
   wherein the method does not include a step of freezing soft bean curd before the step of vacuum freezing, and
   wherein the dried soft bean curd produced from step b) has a hardness of 50 to 90 g measured after recovery by pouring water onto the dried soft bean curd under the following conditions;
   a cylindrical probe having a diameter of 20 mm is used as a probe for measuring the hardness;
   a speed at which the probe descends to a sample (pre-test speed) is set to 1.00 mm/sec;
   a speed at which the probe contacts a surface of the sample and then infiltrates into the sample (test speed) is set to 5.00 mm/sec,
   a speed at which the probe infiltrated into the sample and returns to an original position (post-test speed) is set to 5.00 mm/sec;
   a distance at which the probe recognizes the surface of the sample and infiltrated through the sample is set to 5.000 mm;
   a condition for allowing the probe to recognize the sample (trigger type) is set to force; and
   a minimum force for allowing the probe to recognize the sample (trigger force) is set to 5.0 g.

2. The method of claim 1, wherein in the step of vacuum-freezing, the soft bean curd is rapidly frozen while passing through a section in which a degree of vacuum is 4.5 to 2.0 torr within 30 minutes.

3. The method of claim 1, wherein in the step of vacuum-freezing, the soft bean curd is rapidly frozen while passing through a section in which a central portion temperature of the soft bean curd is 0 to −5° C. within 30 minutes.

4. The method of claim 1, wherein in the step of freeze-drying, the soft bean curd is dried so that a central portion temperature of the soft bean curd becomes 40° C. or less.

5. The method of claim 4, wherein in step of the freeze-drying, in a range of the degree of vacuum of 2 to 0.5 torr, the soft bean curd is dried while controlling a temperature of a heating plate in an apparatus used for freezing and freeze-drying at 10 to 80° C.

* * * * *